United States Patent
Tomko et al.

(10) Patent No.: US 9,135,362 B2
(45) Date of Patent: Sep. 15, 2015

(54) VISUALIZING CHANGES TO CONTENT OVER TIME

(75) Inventors: Daniel Jason Tomko, Bellevue, WA (US); Karim Taji Farouki, Seattle, WA (US); Andrew Bertram Rothbart, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1994 days.

(21) Appl. No.: 11/864,836

(22) Filed: Sep. 28, 2007

(65) Prior Publication Data

US 2009/0089561 A1    Apr. 2, 2009

(51) Int. Cl.
*G06F 17/00*    (2006.01)
*G06F 17/30*    (2006.01)

(52) U.S. Cl.
CPC ...... *G06F 17/30899* (2013.01); *G06F 17/3089* (2013.01)

(58) Field of Classification Search
CPC ............... G06F 17/30867; G06F 17/3089
USPC .................................. 715/205, 273
See application file for complete search history.

(56) References Cited

U.S. PATENT DOCUMENTS

| | | | |
|---|---|---|---|
| 5,204,812 A | | 4/1993 | Kasiraj et al. |
| 5,963,965 A * | | 10/1999 | Vogel ............................ 715/236 |
| 5,978,828 A * | | 11/1999 | Greer et al. .................... 709/224 |
| 6,434,556 B1 | | 8/2002 | Levin et al. |
| 6,560,620 B1 * | | 5/2003 | Ching ........................... 715/229 |
| 6,567,103 B1 | | 5/2003 | Chaudhry |
| 6,915,308 B1 | | 7/2005 | Evans et al. |
| 7,085,753 B2 | | 8/2006 | Weiss et al. |
| 7,089,238 B1 | | 8/2006 | Davis et al. |
| 7,102,643 B2 | | 9/2006 | Moore et al. |
| 7,421,660 B2 * | | 9/2008 | Charnock et al. ............. 715/751 |
| 7,707,210 B2 * | | 4/2010 | Stefik et al. ................... 707/736 |
| 2003/0122874 A1 | | 7/2003 | Dieberger et al. |
| 2006/0265344 A1 | | 11/2006 | Woods |
| 2007/0073748 A1 | | 3/2007 | Barney |
| 2007/0180408 A1 | | 8/2007 | Rusu et al. |
| 2007/0250478 A1 * | | 10/2007 | Copperman ...................... 707/3 |

OTHER PUBLICATIONS

Dubinko, et al., "Visualizing Tags over Time", WWW 2006, May 23-26, ACM, 2006, pp. 10.
Rohrer, et al., "Web-Based Information Visualization", Jul./Aug. 1997, IEEE, 1997, pp. 52-59.
Creasy, "Analyzing File Content History", Perforce User's Conference, Perforce Software, 2005, pp. 1-6.

* cited by examiner

*Primary Examiner* — Amelia Tapp
(74) *Attorney, Agent, or Firm* — Steven Spellman; Jim Ross; Micky Minhas (57) ABSTRACT

A processing device and method are provided for visualizing changes to dynamic content. Dynamic content may be obtained from a content source and a state of the content may be saved. The saved state of the content may be compared with a previously saved state of the content to produce difference data, indicating differences between the saved state of the content and the previously saved state of the content. The obtained content may be presented to a user and may include visual indications pointing out added portions of the content, deleted portions of the content, and/or unchanged portions of the content. In some embodiments, a scheduler may be configured to obtain content and save a state of the content at particular times or upon occurrences of particular events. In various embodiments, aged states of the content may be degraded.

18 Claims, 6 Drawing Sheets

This is an example of a document which will have changes. the Changes may be visually indicated to a user.

FIG. 5

This is an example of a document which will have changes. The changes may be visually indicated to a user.

FIG. 6

This is an example of a document which will have changes. tThe Cchanges may be visually indicated to a user.

VISUALIZING CHANGES TO CONTENT OVER TIME

BACKGROUND

Information from sources, such as, for example, the Internet, or other sources, may be very dynamic over time. For example, a news source may add and update articles. A search using a set of query terms may return different results over time because new Web pages may be added, changed, and deleted, and changes to algorithms for computing relevancy of search query results may be modified. Articles on sites, which rely on solicited contributions or corrections, such as, for example, Wikipedia, or similar sites, may change over time.

Users frequently request and view the same content. Users may view the content weekly, daily, or multiple times per day. Generally, users are most interested in changes to the content. For example, when viewing a news site, users are interested in most recent news articles. When visiting an auction site, users wish to determine whether a high bids changed on items of interest. If the content has not been viewed for a long period of time, changes to the content since a last viewing may be pervasive making it difficult for users to determine exactly what changed and what remained unchanged.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device may obtain content from a content source, and may save a state of the obtained content. The saved state of the obtained content may be compared with a previously saved state of the content to produce difference data indicating differences between the saved state of the content and a previously saved state of the content. The obtained content may be presented and may include visual indications indicating added portions of the content, deleted portions of the content, and/or unchanged portion of the content based on the produced difference data.

In some embodiments, a scheduler may be provided for obtaining content and saving a state of the content under certain conditions, such as, for example, at certain times, or when certain events occur.

In various embodiments, a format and a type of information saved as a state of the content and/or produced as difference data may be configured. In some of the embodiments, an application programming interface may be provided to permit an application to configure the format and the type of information saved as the state of the content and/or produced as the difference data.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure provide a processing device and a method for obtaining content from a dynamic content source, and saving a state of the obtained content. The saved state of the obtained content may be compared with a previously saved state of the content to produce difference data indicating differences between the saved state and the previously saved state. The obtained content may be displayed to a user and may include visual indications indicating new portions of the content, deleted portions of the content, and/or unchanged portion of the content.

In some embodiments, an interface may be provided for configuring conditions for obtaining the content and saving the state of the content. For example, embodiments may be configured to obtain content and save a state of the content upon an occurrence of certain events, such as, for example, starting an application, shutting the application, or other events. Similarly, the interface may be provided for configuring times or time intervals for obtaining content and saving a state of the content. For example, embodiments may be configured to obtain content and save a state of the content every 30 minutes, daily, weekly, at certain times of the day, at certain times of the month or year, or at other times.

The content may include websites, word processing documents, photographs, presentations, network search results, data from web services, or other content. In some embodiments, the dynamic content may be included on one or more local files of the processing device, or on one or more remotely located processing devices accessible via a network.

Exemplary Operating Environment

Figure 1:
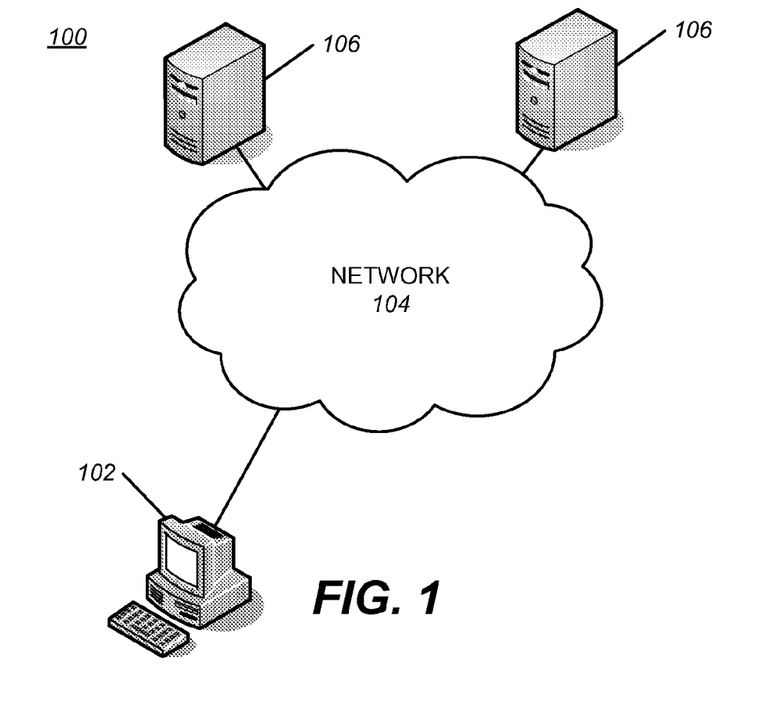
FIG. 1 illustrates an exemplary operating environment for embodiments consistent with the subject matter of this disclosure.

FIG. 1 illustrates an exemplary operating environment 100 for embodiments consistent with the subject matter of this disclosure. Operating environment 100 may include a processing device 102, a network 104, and one or more servers 106.

Processing device 102 may be a user's processing device, such as, for example, a desktop personal computer (PC), a laptop PC, a handheld processing device, or other processing device.

Network 104 may be a single network or a combination of networks, such as, for example, the Internet or other networks. Network 104 may include a wireless network, a wired network, a packet-switching network, a public switched telecommunications network, a fiber-optic network, other types of networks, or any combination of the above.

Server 106 may be a processing device or a group of processing devices configured to work together. In embodiments in which server 106 includes a group of processing devices, the processing devices may be configured as a server farm.

Although FIG. 1 illustrates an environment having two of server 106, various embodiments may include more or fewer of server 106.

Exemplary Processing Device

Figure 2:
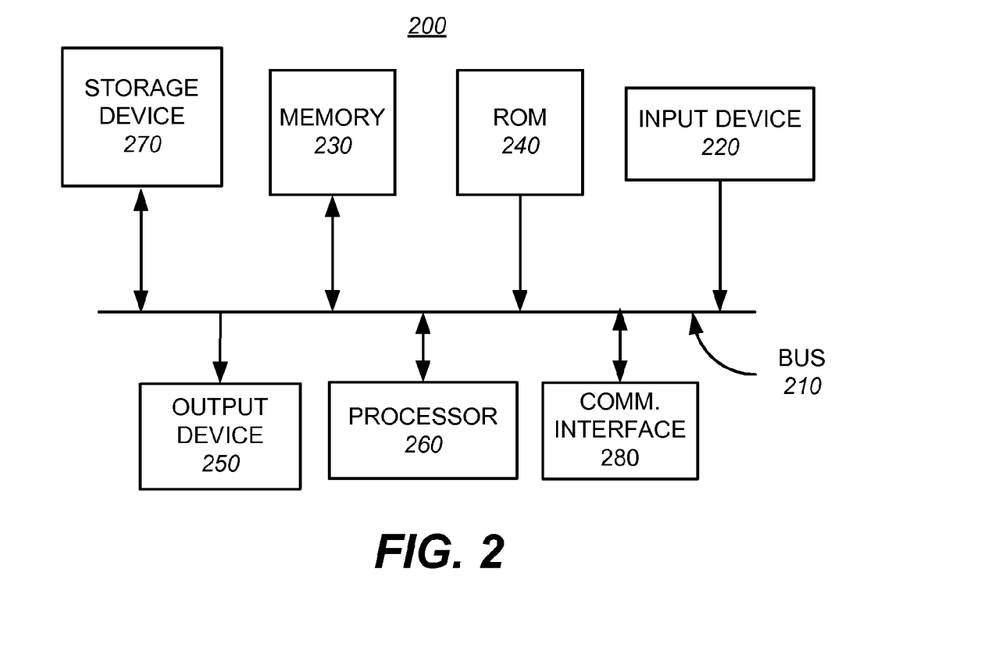
FIG. 2 is a functional block diagram of a processing device, which may be used to implement a server or a processing device shown in FIG. 1.

FIG. 2 is a functional block diagram that illustrates an exemplary processing device 200, which may be used to implement embodiments of processing device 102 and/or server 106 consistent with the subject matter of this disclosure.

Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include a compact disc (CD), digital video disc (DVD), a magnetic medium, or other type of storage device for storing data and/or instructions for processor 260.

Input device 220 may include a keyboard or other input device. Output device 250 may include one or more conventional mechanisms that output information, including one or more display screens, printers, or other output devices.

Communication interface 280 may include a transceiver for transmitting and receiving information to or from network 108. Communication interface 280 may transmit and receive information via a wireless or wired connection.

Processing device 200 may perform such functions in response to processor 260 executing sequences of instructions contained in a tangible machine-readable medium, such as, for example, memory 230, ROM 240, storage device 270, or other medium. Such instructions may be read into memory 230 from another machine-readable medium or from a separate device via communication interface 280.

Functional Diagram

Figure 3:
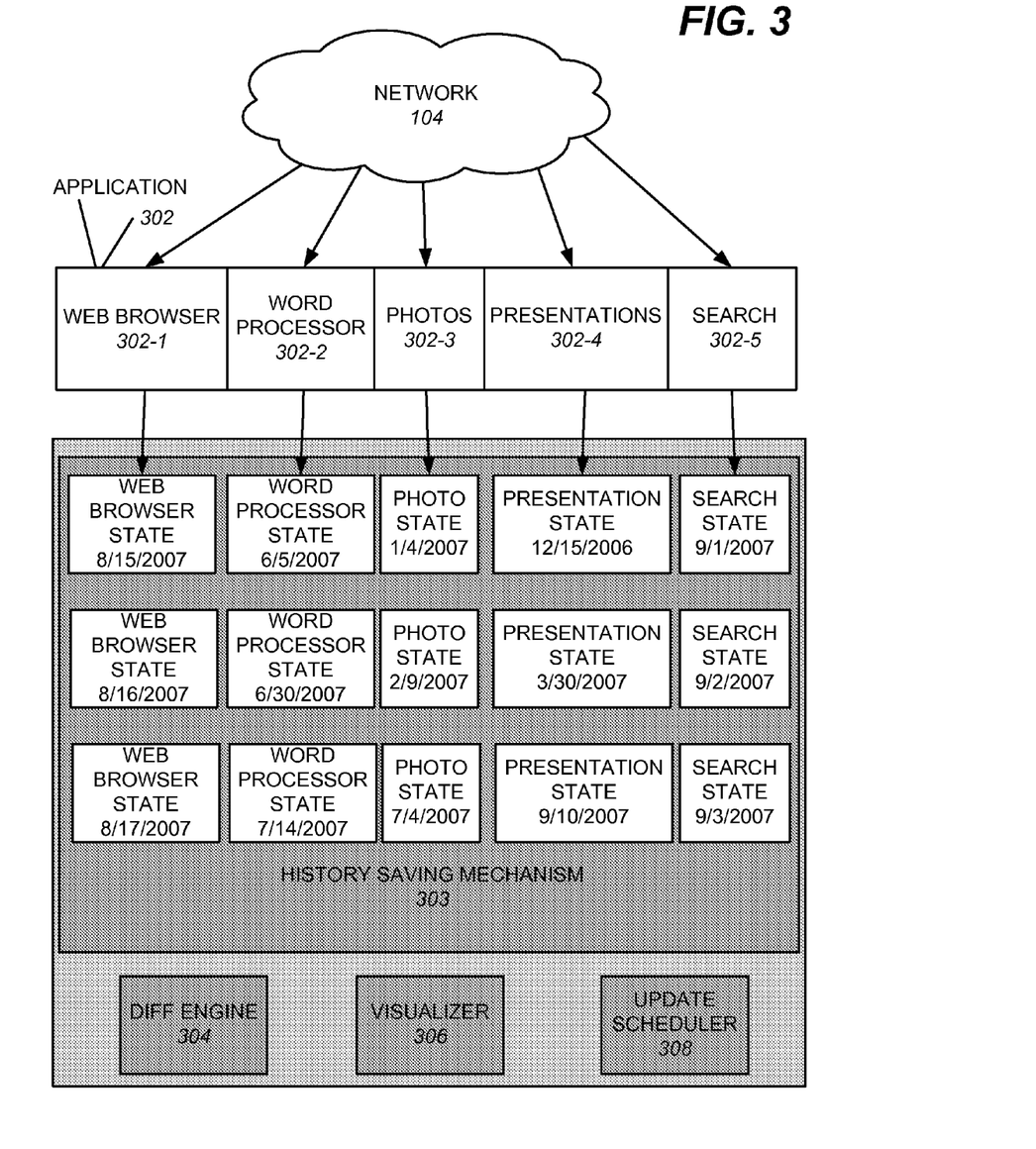
FIG. 3 is a functional block diagram illustrating functions and operations which may be provided in an embodiment of a processing device consistent with the subject matter of this disclosure.

FIG. 3 is a functional block diagram of an embodiment consistent with the subject matter of this disclosure executing in processing device 102. Processing device 102 may include one or more of application 302, which may receive dynamic content from one or more remote sources via network 104, or from a local source, such as, a file or other source. Processing device 102 may further include a history saving mechanism 303 for saving a state of the received dynamic content, a difference engine 304, a visualizer 306, and an update scheduler 308.

History saving mechanism 303 may save a state of received dynamic content in one of a number of resolutions. For example, a complete state may include enough information to reproduce the content exactly. At a slightly lower resolution, a state may include a miniature, non-interactive version of the received dynamic content. At a bare minimum, a state may include enough information to re-query content sources, such that the content may be reproduced from received query results. In one embodiment, a saved state may include an image of obtained content, saved pixel-by-pixel. In some embodiments, the saved pixel-by-pixel image of the obtained content may be a default format for saving a state. Another format of the saved state may include information describing content and layout of the obtained content, such as, for example, hypertext markup language (HTML), or other information describing content and layout, which may be useful for content including web pages. A third format of the saved state may include textual content of a document, such as, for example, a word processing document, or other textual document. In other embodiments, the saved state may be saved in other formats useful for particular applications.

Application 302 may include a web browser 302-1, a word processor 302-2, a photographic viewing application 302-3, a presentation application 302-4, a searching application 302-5, another application, or any combination of the aforementioned one or more applications.

When application 302 includes web browser 302-1, content may be obtained from a dynamic content source, via network 104, and a state of the content may be saved. FIG. 3 shows the state of the obtained content from a particular dynamic content source being saved on Aug. 15, 2007, Aug. 16, 2007 and Aug. 17, 2007.

When application 302 includes a word processor 302-2, content of a word processor document may be obtained, and a state of the obtained content may be saved. FIG. 3 shows a state of the obtain word processor document content being saved on Jun. 5, 2007, Jun. 30, 2007, and Jul. 14, 2007.

When application 302 includes photographic viewing application 302-3, content of a photographic image may be obtained from a local source, or a remote source through network 104, and a state of the obtained content of the photographic image may be saved. FIG. 3 shows the state of the obtained photographic content from a particular source being saved on Jan. 4, 2007, Feb. 9, 2007, and Jul. 4, 2007.

When application 302 includes presentation application 302-4, content of a presentation may be obtained via a local source, or via a remote source through network 104, and a state of the obtained presentation content may be saved. FIG. 3 shows the state of the obtained presentation content from a particular presentation source being saved on Dec. 15, 2006, Mar. 30, 2007, and Sep. 10, 2007.

When application 302 includes a search application 302-5, content of a search result, such as, for example, a network search, may be obtained and a state of the obtained search result may be saved. FIG. 3 shows a state of the obtained search result for a particular search query being saved on Sep. 1, 2007, Sep. 2, 2007 and Sep. 3, 2007.

Difference engine 304 may compare a pair of saved state of contents to produce difference data. Difference data may vary based, at least in part, on a type of data included in and a format of the compared pair of saved state of contents. For example, when the compared pair of saved state of contents includes respective images of the obtained content, the difference data may include information with respect to differences, pixel-by-pixel, between the respective images. Thus, a pair of images may be compared, pixel-by-pixel, and produced difference data may include information with respect to pixels changed in a later one of the pair of images.

In some embodiments, states may include textual information from a textual document. In such embodiments, difference data may include information with respect to changes in textual content from an older saved state of content to a newer saved state of content.

The above-mentioned examples of different types of difference data are only exemplary. In other embodiments, other types of difference data having other formats may be produced, and may, in some cases, be application-specific, such as, for example, containing certain keywords, or other information.

Visualizer 306 may display obtained content, showing additions, changes, and deletions made with respect to the obtained content. The changes may be highlighted, circled, or otherwise indicated. For example, new portions of the content may be circled, or underlined, deleted portions of the content may have a strikethrough, and unchanged portions of the content may have a colored background, or may be indicated by a lack of circling, underlining, strikethroughs, or other markings. In other embodiments, changes may be visually indicated by other methods.

Update scheduler 308 may provide a facility for configuring conditions under which content may be obtained and a state of the content may be saved. For example, update scheduler 308 may obtain content and save a state of the content when a triggering event occurs, such as, for example, an application starting, an application closing, or other triggering events. Further, update scheduler 308 may obtain content and save a state of the content at certain times, such as, for example, at particular dates and times, at particular time intervals (hourly, daily, weekly, monthly, or other time intervals), or at other times.

Exemplary Processing

Figure 4:
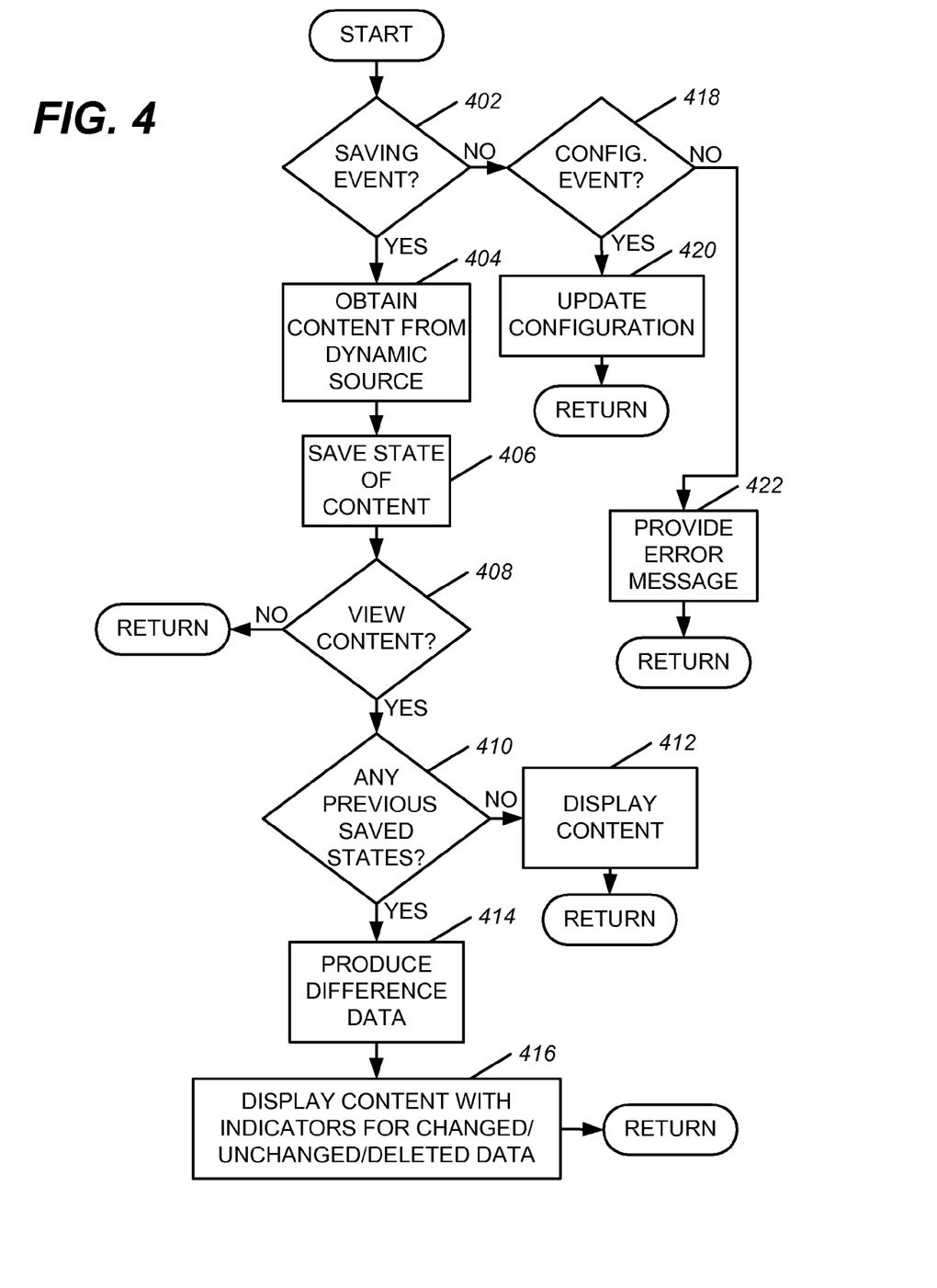
FIG. 4 is a flowchart illustrating an exemplary process which may be performed in embodiments consistent with the subject matter of this disclosure.

FIG. 4 is a flowchart of an exemplary process, which may be performed in an embodiment consistent with the subject matter of this disclosure. The process may execute in processing device 102 and may be called upon an occurrence of an event, such as a saving event, or configuration of event. A saving event may occur when a user requests content from a source using application 302, when update scheduler 308 detects an occurrence of a predetermined triggering event or a predetermined time, time period, or time interval.

The process may begin with processing device 102 determining whether a saving event occurred (act 402). If processing device 102 determines that a saving event occurred, then processing device 102 may obtain content from a dynamic source (act 404). History saving mechanism 303 may then save a state of the obtained content (act 406), as previously discussed.

Visualizer 306 may then determine whether content is to be viewed (act 408). For example, if the occurrence of the saving event resulted from the user requesting content, then the content may be viewed. If visualizer 306 determines that the content is to be viewed, then visualizer 306 may determine whether there are any previous saved states with respect to the content (act 410). If there are no previous saved states of the content, then visualizer 306 may display the content (act 412). Otherwise, difference engine 304 may produce difference data by comparing the saved state of the content with a previously saved state of the content (act 414). Visualizer 306 may then display the content, which may have visual indicators to indicate changed, unchanged, and/or deleted portions of the content, based on the produced difference data (act 416). As mentioned previously, in one embodiment, newly inserted portions of the content may be indicated by highlighting, circling, underlining, or other visual indicators. Deleted data may be indicated by a strikethrough, or other visual indicator. Unchanged data may be indicated by an absence of highlighting, circling, underlining, strikethroughs, or other visual indicators. In one embodiment, unchanged data may be indicated by a surrounding background of a particular shade or color.

Returning to act 402, if processing device 102 determines that the event is not a saving event, then processing device 102 may determine whether the event is a configuration event (act 418). A configuration event may occur when a request is made to configure update scheduler 308 to save state information with respect to content from a particular source upon an occurrence of a triggering event or at a particular time or time interval, or when a request is made for configuring a type of state information to save, or a type of difference data to produce. In some embodiments, a user interface may be provided for a user to enter configuration information for update scheduler 308. Further, in some embodiments, an application programming interface may be provided, such that an application program may, via the application programming interface, configure a type and/or a format of state information to save and/or a type of difference data to produce. If processing device determines that the event is a configuration event, then processing device 102 may update configuration information accordingly (act 420).

Figure 5:
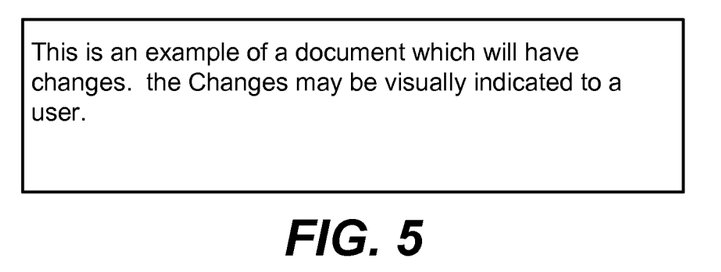
FIGS. 5-7 illustrate exemplary displays showing how changed data may be visually indicated in one embodiment consistent with the subject matter of this disclosure.
Figure 6:
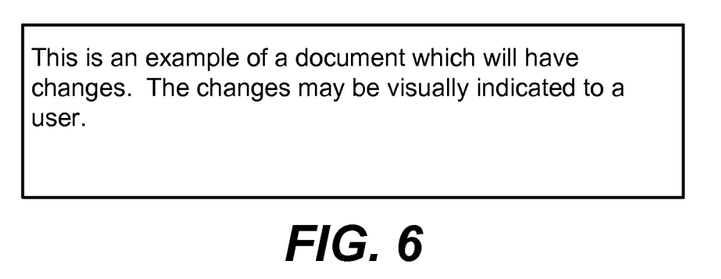
Figure 7:
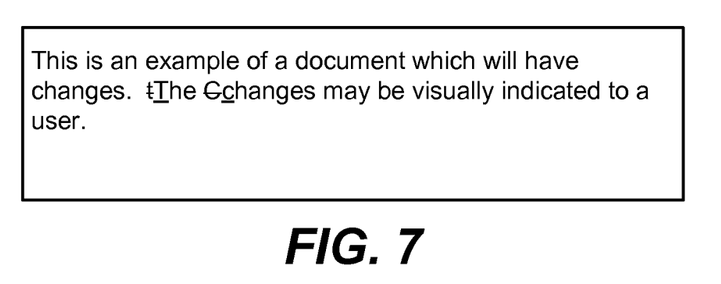

FIGS. 5-7 illustrate how changed content may be presented in one embodiment consistent with the subject matter of this disclosure. FIG. 5 shows content obtained at a first time. FIG. 6 shows the content obtained at a second time, which is later than the first time. Notice that capitalization of "The changes" in the second sentence of FIG. 6 differs from "the Changes" in the second sentence of FIG. 5. FIG. 7 illustrates an exemplary display highlighting changed content. For example, at least a portion of content with respect to FIGS. 5 and 6 may be saved, respectively, as saved state of the content. The saved state of the content with respect to FIGS. 5 and 6 may be compared to produce difference data for generating a display, as illustrated in FIG. 7. In FIG. 7, a strikethrough of "t" and "c" indicate that these letters were deleted, and letters "T" and "c" are underlined indicating that these letters are newly added.

In other implementations, other methods of indicating changed content may be employed. For example, if the obtained content is a result of a search, listing various sources, difference data may indicate which ones of the sources are new. Visualizer 206 may present the content, in one embodiment, such that new ones of the sources may be listed before previously seen ones of the sources. In another embodiment, visualizer 306 may present the content such that only new ones of the sources may be listed.

Figure 8:
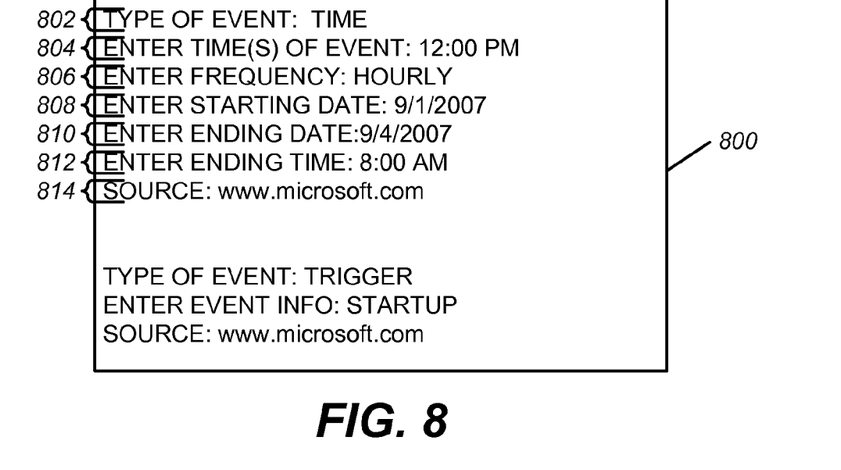
FIG. 8 illustrates an exemplary user interface for configuring a scheduler for obtaining content and saving a state of the content in embodiments consistent with the subject matter of this disclosure.

FIG. 8 illustrates exemplary user interface 800 for configuring a time or interval-based event with respect to update scheduler 308, as well as a triggering event with respect to update scheduler 308. As shown by exemplary user interface 800, a user may be prompted 802 to enter a type of event, such as a time event for indicating a particular time or a time interval, or a triggering event for indicating a particular event or condition. When configuring a time or interval-based event, the user may be prompted to enter a starting time for beginning generation of the event 804, an interval for repeating the generation of the event 806, a starting date for generation of the event 808, an ending date for the generation of the event 810, an ending time for generation of the event 812, and source information 814. Exemplary user interface 800 shows an hourly time event starting at 12 p.m. on Sep. 1, 2007, repeating hourly, and ending at 8 a.m. Sep. 4, 2007, for retrieving content and saving a state of the content with respect to content from a source, which in this example is a website, "www.microsoft.com". Exemplary user interface 800 also shows a triggering event occurring at startup of an application with respect to content from the source, "www.microsoft.com". When each of the events occur, they may each be classified as saving events that are not to be viewed, and, as indicated in FIG. 4, dynamic content from a particular source may be obtained and a state of the dynamic content may be saved.

Figure 9:
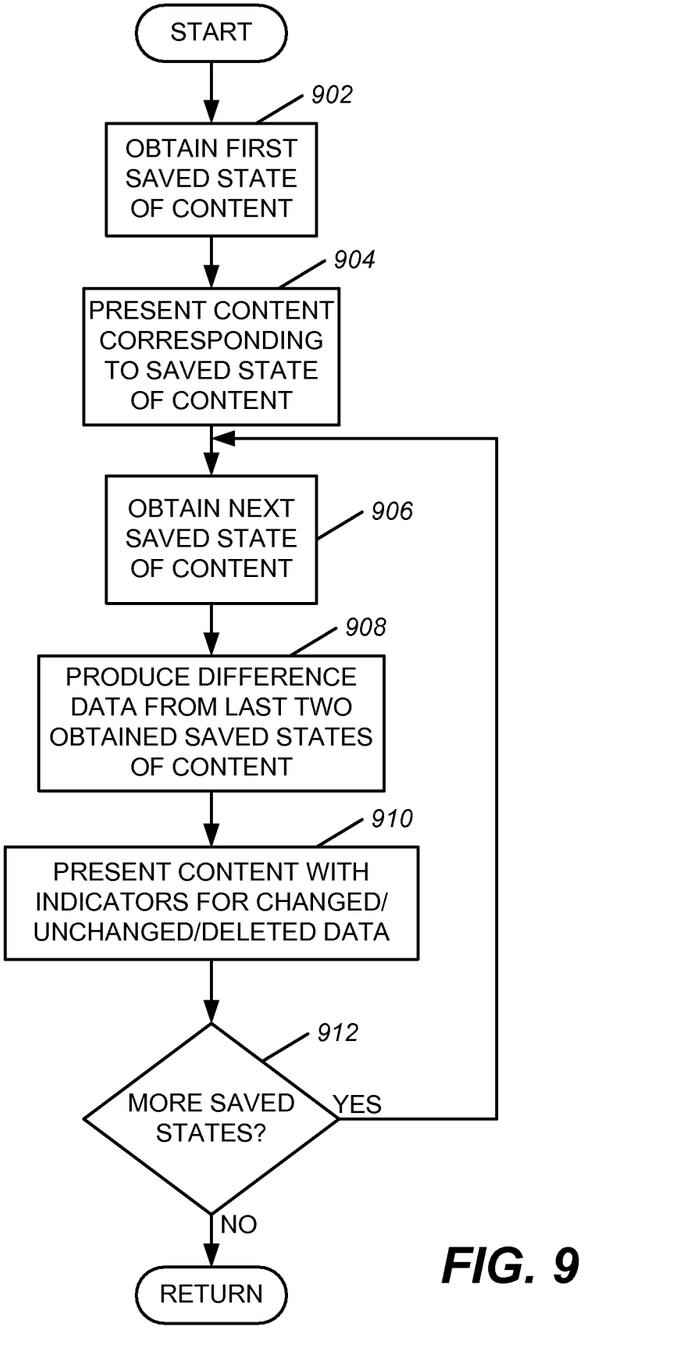
FIG. 9 is a flowchart illustrating an exemplary process for presenting content, based on saved states of the content, having visual indicators showing changes to the content, in an embodiment consistent with the subject matter of this disclosure.

FIG. 9 is a flowchart illustrating an exemplary process for presenting information with respect to saved states of the content in an embodiment of processing device 102 consistent with the subject matter of this disclosure. The process may begin with visualizer 306 obtaining a first saved state information with respect to particular content (act 902). Visualizer 306 may then present content corresponding to the first saved state of the content (act 904). The content may be presented by displaying the content on a display screen of processing device 102 or by outputting the content to an output device, such as, for example, a printer or other output device.

Processing device 102 may then obtain a next saved state of the content with respect to the particular content (act 906). Processing device 102 may then produce difference data by comparing the last two items of obtained saved states of content (act 908). Processing device 102 may present the particular content with indicators indicating changed, unchanged, and deleted data, as mentioned previously (act 910). The content may be presented by displaying the content on a display screen of processing device 102 or by outputting the content to an output device, such as, for example, a printer or other output device.

Processing device 102 may then determine whether there are any additional saved states of the content (act 912). If there are no additional saved states of the content, then the process is complete. Otherwise, acts 906-912 may be repeated.

In a variation of the exemplary processing of FIG. 9, a user may provide a date or time range and may specify an indication of a source of content, such that the content may be presented with visual indicators indicating added, deleted, and unchanged data with respect to saved states of the content corresponding to the provided date or time range.

In some embodiments consistent with the subject matter of this disclosure, saved state of the content may be degraded, such that the saved state of the content may have a lower resolution than as originally saved. For example, if textual information is included in the saved state information, and the textual information is saved in blocks, which may correspond to paragraphs, then degrading the saved state information may result in a sentence at a beginning and a sentence at an end of a block being saved with remaining information in the block being deleted. In other embodiments, saved state information may be degraded in numerous other ways.

Figure 10:
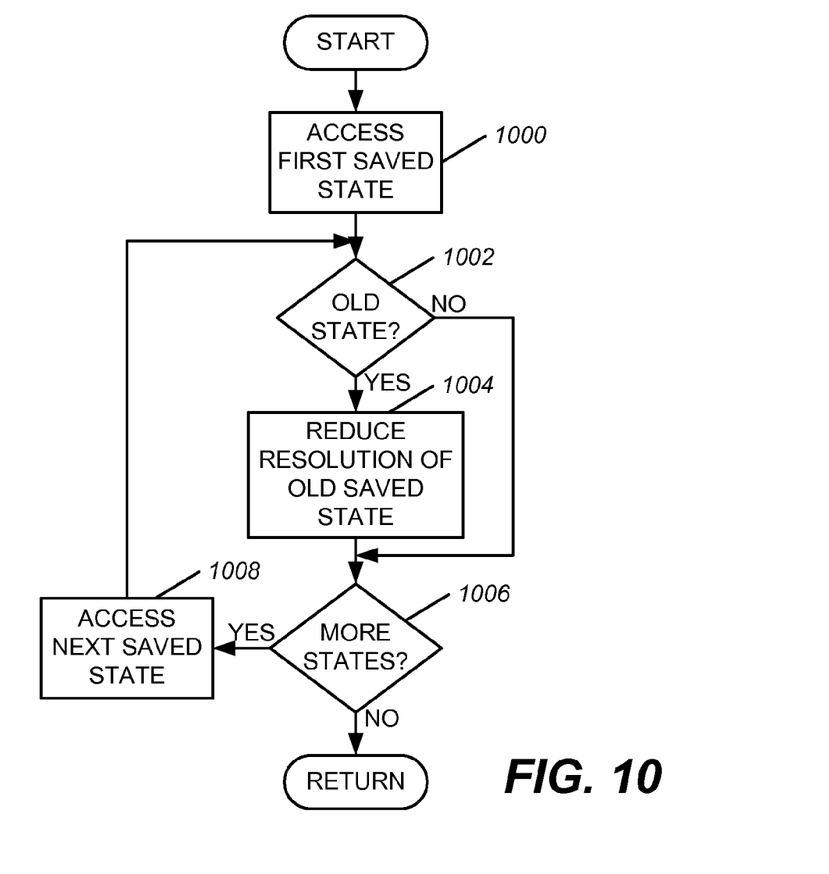
FIG. 10 is a flowchart of an exemplary process for degrading aged saved state of content information, in an embodiment consistent with the subject matter of this disclosure.

FIG. 10 is a flowchart illustrating an exemplary process for degrading aged saved states of the content. The process may begin with processing device 102 accessing a first item of saved state of the content (act 1000). Processing device 102 may then determine whether the saved state of the content is older than a predetermined amount of time, such as, for example, six months, one year, or another predetermined amount of time (act 1002). In one embodiment, each item of saved state of the content may include a timestamp, such that an age of each of the items may be determined.

If processing device 102 determines that the saved state of the content is older than the predetermined amount of time, then processing device 102 may reduce resolution, or degrade, the saved state of the content (act 1004). Processing device 102 may then determine whether an age of any additional saved states of the content are to be determined (act 1006). If the age of at least one additional state of the content is to be determined, then processing device 102 may access a next item of the saved state of the content (act 1008) and acts 1002-1006 may be repeated.

If, during act 1006, processing device 102 determines that the age of additional states of the content information are not to be determined, then the process may be completed.

The process illustrated by the flowchart of FIG. 10 is only exemplary. In other embodiments consistent with the subject matter of this disclosure, additional or different acts may be performed, or an order of the acts may differ. Further, in some embodiments, multiple degradations of saved state information may be performed. For example, after a first predetermined age, a first degradation of saved state of the content may occur, at a second predetermined age a second degradation of the saved state of the content may occur, and so on. In some embodiments, after a particular predetermined age, an item of saved state of the content may be deleted.

The difference data produced by comparing items having degraded saved state information may be degraded. Using the example presented above, in which saved state of the content includes textual information saved in blocks, or paragraphs, a degraded block may include only a first and last sentence of a paragraph. Difference data produced from a comparison of such a degraded block may include degraded difference data, such as, for example, information with respect to differences of retained state of the content information (i.e., the first and last sentences of the paragraph). In such a case, content presented with indicators for changed, unchanged, and/or deleted data from the difference data may be degraded. For example, the above-mentioned degraded paragraph may be presented showing only the first and last sentence of a block, or paragraph, with any changes in the first and last sentence being visually indicated.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A machine-implemented method for visualizing changes to content over time, the machine-implemented method comprising:
    obtaining content from a content source;
    saving a state of the obtained content from only one item of a group of items in one of a plurality of resolutions, a first one of the plurality of resolutions including first information for exactly reproducing the content, and a second one of the plurality of resolutions including second information for re-querying the content source;
    comparing the state of the content with a previous state of the content from the only one item of the group of items to determine difference data that reflects a difference between the state of the content and the previous state of the content and to produce difference that is displayable together with the content, via an electronic display, as visual indicators within the content;
    displaying, based on the difference data, one or more changed portions of the obtained content and one or more unchanged portions of the obtained content;
    degrading the saved state of the obtained content to a lower resolution by deleting information in the content after an age of the saved state of the obtained content exceeds a predetermined amount of time; and
    degrading the displayed one or more changed portions of the obtained content and the one or more unchanged portions of the obtained content, when the resolution is degraded.

2. The machine-implemented method of claim 1, wherein information saved as the state of the content is configurable.

3. The machine-implemented method of claim 1, wherein the difference data includes application-specific difference data.

4. The machine-implemented method of claim 1, further comprising: configuring a format of the difference data.

5. The machine-implemented method of claim 1, further comprising:
    configuring at least one triggering event for triggering: the obtaining of content from a content source; and the saving of a state of the content.

6. The machine-implemented method of claim 1, further comprising: providing an application programming interface for an application to configure a type of the difference data.

7. A processing device comprising:
    at least one processor; and
    a memory connected to the at least one processor, the memory including instructions for the at least one processor, the instructions comprising:
    instructions for obtaining dynamic content;
    instructions for saving a state of the obtained dynamic content, a format of information to be saved as the state of the dynamic content being configurable;
    instructions for comparing the state of the dynamic content with a previously-saved state of the dynamic content to produce difference data that is displayable as indications within the content, when the content is displayed;
    displaying, based on the difference data, changed portions of the obtained content and unchanged portions of the obtained content;
    degrading the saved state of the obtained content to a lower resolution by deleting information in the content after the saved state of the obtained content ages beyond a predetermined amount of time; and
    degrading the displayed changed portions of the obtained content and the unchanged portions of the obtained content, when the resolution is degraded.

8. The processing device of claim 7, wherein the instructions further comprise:
    instructions for an update scheduler to obtain the dynamic content and save the state of the obtained dynamic content at a particular time of a day, a month, or a year or at particular time intervals.

9. The processing device of claim 7, wherein the instructions further comprise:
    instructions for permitting a user to configure conditions under which the update scheduler obtains the dynamic content and saves the state of the dynamic content;
    instructions for an update scheduler to obtain the dynamic content and save the state of the obtained dynamic content according to the configured conditions.

10. The processing device of claim 7, wherein the instructions further comprise:
    instructions for permitting a user to configure events with respect to an update scheduler, and
    instructions for detecting an occurrence of one of the events and responsive to the detecting of the occurrence, the update scheduler obtaining dynamic content and saving a state of the dynamic content, and
    instructions for producing difference data based on comparing the state of the dynamic content with a previously-saved state of the dynamic content.

11. The processing device of claim 7, wherein the instructions for displaying differences in the dynamic content based on the produced difference data further comprise:
    instructions for indicating added portions of the dynamic content and deleted portions of the dynamic content.

12. The processing device of claim 7, wherein the instructions further comprise: instructions for providing an application programming interface to permit an application to specify that the difference data include certain keywords.

13. The processing device of claim 7, wherein: the dynamic content includes the network search result.

14. A machine-readable medium having stored thereon instructions for at least one processor of a processing device, the instructions comprising:
    instructions for obtaining content from a dynamic content source;
    instructions for saving state information of the obtained content;
    instructions for providing a facility for configuring a format of information to be saved as the state information;
    instructions for producing difference data based on comparing the saved state information with previously-saved state information with respect to previously obtained content from the dynamic content source; and
    instructions for displaying and pointing out changed portions of the obtained content and unchanged portions of the obtained content with respect to the previously obtained content, by displaying the changed portions, the unchanged portions and visual indicators together in a composite format;

instructions for degrading the saved state of the obtained content to a lower resolution by deleting information in the content after an age of the saved state of the obtained content exceeds a predetermined amount of time; and instructions for degrading displayed changed portions of the obtained content and displayed unchanged portions of the obtained content, when the resolution is degraded.

15. The machine-readable medium of claim 14, wherein the instructions for displaying the obtained content and pointing out changes to the obtained content further comprise:

instructions for highlighting new content and displaying strikethroughs through deleted content within the displayed obtained content.

16. The machine-readable medium of claim 14, wherein: the obtained content includes the network search result, and new results of the network search result are listed before other results.

17. The machine-readable medium of claim 14, wherein the instructions further comprise:

instructions for providing a facility to schedule time periods for an update scheduler such that, during the time periods, the update scheduler obtains content from the dynamic content source and saves the state information, with respect to the obtained content.

18. The machine-readable medium of claim 14, wherein the instructions further comprise:

degrading a resolution of the saved state information when the saved state information ages beyond a predetermined amount.

* * * * *